United States Patent [19]

Hirata

[11] 3,730,614
[45] May 1, 1973

[54] OVERLAP CONTROL DEVICE FOR A MOTION PICTURE CAMERA

[75] Inventor: Hiroshi Hirata, Sakai-shi, Osaka-fu, Japan

[73] Assignee: Minolta Camera Kabushiki Kaisha, Osaka, Japan

[22] Filed: July 23, 1970

[21] Appl. No.: 57,537

[30] Foreign Application Priority Data

July 31, 1969  Japan.............................44/60013

[52] U.S. Cl................................................352/91
[51] Int. Cl..............................................G03b 21/36
[58] Field of Search................................352/91, 217

[56] References Cited

UNITED STATES PATENTS

| 3,549,249 | 12/1970 | Katsuyama | 352/217 |
| 3,494,691 | 2/1970 | Katsuyama | 352/91 |
| 3,545,852 | 12/1970 | Winkler | 352/91 |

FOREIGN PATENTS OR APPLICATIONS

| 629,287 | 4/1936 | Germany | 352/217 |

Primary Examiner—S. Clement Swisher
Assistant Examiner—Denis E. Corr
Attorney—Watson, Cole, Grindle & Watson

[57] ABSTRACT

An overlap photographic control device uses a manually operated change-over member to effect either normal or overlap photographic operation in accordance with the position of the change-over member. A switch operated by the change-over member drives the camera motor in a reverse direction to rewind the film and the switch is retained by a lock member until a clutch, associated with the change-over member, drives a control gear to close the aperture. After the shutter is driven to a position to block light rays the control gear is disengaged from the clutch and the sector gear actuates the switch lock member to enable the switch to change the direction of the motor. The change-over operation member is released and allowed to return to its normal photographic position. Automatic control of fade in and fade out photography is thereby obtained.

2 Claims, 2 Drawing Figures

INVENTOR

Hiroshi Hirata

BY

Watson, Cole, Grindle & Watson

ATTORNEY

OVERLAP CONTROL DEVICE FOR A MOTION PICTURE CAMERA

BACKGROUND OF THE INVENTION

In the prior art motion picture cameras, fade out photography, the rewinding of the film thereof, and fade in photography respectively required separate operations. Overlap photography requires looking for the film length required by relying on the picture frame number. The film is then rewound that length, and overlapping photography taken for that length of as said length film as said length.

It is very difficult for only one operator to perform such operations because he must read the picture frame number of the film from the frame meter while taking a photograph and viewing an object in the finder. Such operation is unstable and unreliable resulting in failure of overlap photography in many cases.

SUMMARY OF THE INVENTION

The present invention comprises a change-over operation member for switching between normal photography and overlap photography, a device for locking the change-over operation member in either one of two positions, a switch interlocked with the change-over operation member, a fade in and fade out control device provided with an interlocking clutch and operated by that clutch, a time set up release member, a change-over switch for switching over the polarity of the motor electric power source, and a lock member for the change-over switch. The control device is so arranged that the first switch is closed by the change-over operation member, the interlocking clutch allows the control device to control fade out photography and just as fade out photography is completed the time set up release member releases the switch lock member to change over automatically the change-over switch to rewind the film and concurrently starts the returning process. At the same time as the film rewind is completed the release member releases the changeover lock member to allow it to return automatically and changes over again the change-over switch to open the first switch and also operates the interlocking clutch to enable the control device to control fade in photography. By the subsequent release operation fade in photography operates only for those film picture frames that were rewound and changed over automatically to normal photography.

The primary object of the present invention is to provide an automatic overlap photographic control device in a motion picture camera.

The second object of the present invention is to provide an improved overlap photographic control device wherein fade out photography for a given film picture frame number, the rewinding for the film picture frame number, fad in photography for the film picture frame number, and the subsequently return to normal photography are automatically changed over.

A feature of the present invention is that normal photography is obtained by the normal shutter release operation and fade out photography and the rewind operation thereof are automatically achieved by the operation of a change-over operation member regardless of the release operation, and through the release operation after the rewind is completed fade in photography and the subsequent normal photography are accomplished.

DESCRIPTION OF THE PREFERRED EMBODIMENT

Figure 1:
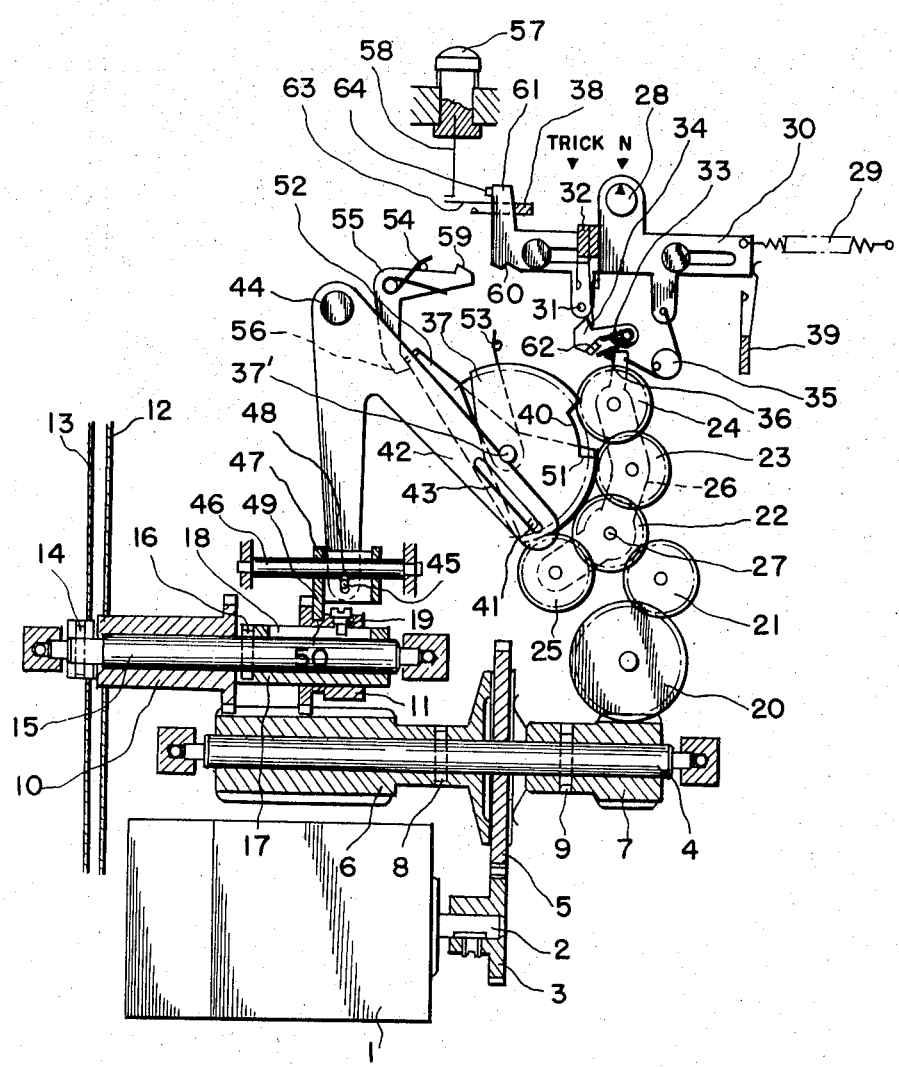
FIG. 1 is a sectional side view of the overlap photography control device in accordance with the present invention.

With reference to the accompanying drawings, driving gear 3 is fixed to motor shaft 2 of motor 1 and meshes with gear 5 coupled frictionally with intermediate shaft 4. To intermediate shaft 4 shutter chain gear 6 and control chain gear 7 are respectively fixed by pins 8, 9.

To sleeve 10 having a gear meshed with shutter chain gear 6 shutter blade 12 is fixed, and there is a cam ring 17 fixed by pin 16 to main shaft 15 mounted rotatably on sleeve 10, and having cam slot 18 extending in the axial direction. On cam ring 17 sleeve 11 is slidably mounted and cam pin 19 retains cam ring 17. And, a gear attached to sleeve 11 also meshes with shutter chain gear 6. On the end of main shaft 15 there is provided fixedly screen blade 13 so as to be located in front of shutter blade 12.

Gears 20, 21 meshed with control chain gear 7 also mesh with gear 22 connected to axle 27, and on gear lever 26 connected rotatably to axle 27, train gearing 23, 24, 25 meshes with gear 22.

Change-over operation member 30 for switching between normal overlap photography is supported slidably to the right and left by the guide slot thereof and the pin provided on the camera body, and operated manually by knob 28.

On the knob identifying marks are located, and the formation is arranged so as to allow the marks to correspond to the instruction "TRICK" for denoting overlap photography on the left on the camera body side and the identification N for denoting normal photography on the right, and member 30 is held to the right by means of tension spring 29.

Figure 2:
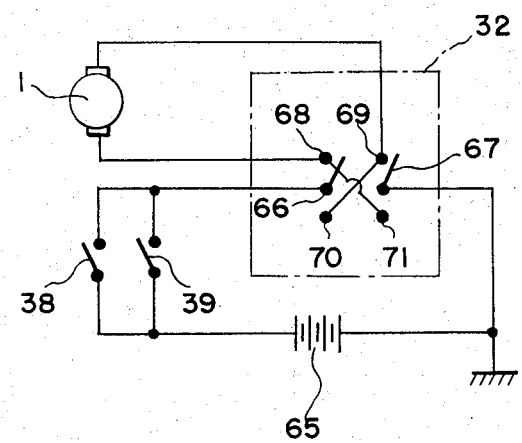
FIG. 2 is a circuit diagram for the embodiment shown in FIG. 1.

On opposite respective ends of change-over operation member 30, change-over switch 32 and keep up switch 39 are provided. Change-over switch 32, in the circuit diagram shown in FIG. 2, is so equipped that contact pieces 66, 67 are changed over to contacts 68, 69 and contacts 70, 71, and contact pieces 66, 67 are normally in contact with contacts 70, 71 which turns motor 1 in a direction to rewind the film through electric power source 65. And, when said change-over operation member 30 indicates N motor 1 is turned in the normal direction with contact pieces 66, 67 in contact with contacts 68, 69 and are restrained by switch lock lever 54 having a clockwise turning tendency through spring 33.

Switch 39 is interposed between electric power source 65 and one contact piece 66 of change-over switch 32, and when change-over operation member 30 is in the N position switch 39 is pushed by the end face of change-over operation member 30 to an open position against its spring tension, and when change-over operation member 30 is in the TRICK position switch 39 is closed automatically through its spring tension.

Power switch 38 provided in parallel with said keep up switch 39 is normally open, and closed when its contact piece 63 is pushed by spring 58 provided on release button 57.

On the front under-side of change-over operation member 30 notch 60 is provided, and when change-over operation member 30 is in the TRICK position, change-over lock lever 55 having pawl 59 for engaging with notch 60 has a counter-clockwise turning tendency through spring 54 and is pivoted on the camera body. And, on the upper portion of change-over operation member 30 there is provided bent piece 61 having slant face 64, and when change-over operation member 30 is in the TRICK position, slant face 64 bends contact piece push spring 58 of release button 57 against its elasticity to retract it from contact piece 63 of power switch 38. And, on change-over operation member 30 there is provided coil spring 35, the other end of which is connected to one end of gear train lever 26, and with the progressive sliding of change-over operation member 30 to the right or left, coil spring 35 swings gear train lever 26 on axle 27 to operate as an interlocking clutch.

Control gear 37 with which either fade in gear 24 or fade out gear 25 provided on both ends of gear train lever 26 meshes in accordance with the positioning of gear train lever 26 for constituting said interlocking clutch is mounted on axle 37' and provided with toothless portion 40 and driving pin 41. To axle 37' of control gear 37 there is connected sector gear 51 which initiates the release after an interval of time so as to mesh with fade out gear 25, and control gear 37 has a counterclockwise turning tendency through weak spring 53, and arm 52 is in pressing contact with the other arm 56 of changeover lock lever 55, and when lever 55 is turned clockwise arm 52 engages with bent-up portion 62 of switch lock lever 34 to turn it counter-clockwise.

On one arm of operation lever 42, connected by axle 44 rotatably to the camera body and having two arms, there is provided engage slot 43 in which driving pin 41 of control gear 37 is fitted and on the other arm thereof pin 45 is provided.

Sliding plate 47 guided by guide shaft 46 provided parallel with main shaft 15 is provided with engage slot 48 and protrusion 49, and in engage slot 48 pin 45 of operation lever 42 is fitted to engage therewith and protrusion 49 engages with notch 50 of sleeve 11 on cam ring 17.

Since the present invention is formed as described above, when change-over operation member 30 is pulled to the right by tension spring 29 and located in the N position at the right end thereof, gear train lever 26 is turned counter-clockwise, and fade in gear 24 is turned up to the position for engaging with control gear 37 by stopper pin 36 and fade out gear 25 is retracted. However, toothless portion 40 of control gear 37 faces gear 24 so that it is not rotated.

And, switch 39 is opened, and change-over switch 32 is changed so that motor 1 is turned in the normal direction and every part takes the respective position shown in FIG. 1.

In this state, when release button 57 is pushed down, contact piece push spring 58 closes power switch 38, and motor 1 takes up the film and turns through the gear on sleeve 10 and turns shutter blade 12 to take a photograph. And in this case, as described above toothless portion 40 of control gear 37 faces fade in gear 24 and holds its position without turning, and pin 41 has retained operation lever 42 in the counter-clockwise turning position so that sliding plate 47 stays in the right position on guide shaft 46. The position of cam ring 17 at that juncture is designed so that screen blade 13 connected fixedly to main shaft 15 and shutter blade 12 are in the same phase, therefore, a normal photograph is obtained and just as released button 57 is released the photograph is stopped.

Next, in order to take an overlap photograph, while pushing release button 57 change-over operation member 30 is slid to the left against tension spring 29 by means of knob 28 thereof, and when the mark corresponds to the identification TRICK, pawl 59 of change-over lock lever 55 engages with notch 60 of change-over operation member 30 and change-over operation member 30 is restrained in its position.

Accordingly, the following operations are effected in order:

1. Switch 39 is closed
2. Contact piece push ring 58 is pushed by bent piece 61 and retracted from contact piece 63 of power switch 38 and the power switch is opened. That is, regardless of the movement of release button 57 electric power source 65 is connected to motor 1 by switch 39.
3. Through coil spring 35, gear train lever 26 of the interlocking clutch is turned clockwise, and fade in gear 24 recedes and fade out gear 25 is turned to the position to mesh therewith.
4. Fade out gear 25 meshes with control gear 37 and time set up release gear 51 to turn them clockwise.
5. Because of the turning of control gear 37, driving pin 41 thereof turns operation lever 42 clockwise.
6. Pin 45 of operation lever 42 moves sliding plate 47 to the left along guide shaft 46, and with the progress of this operation sleeve 11 slides to the left on cam ring 17 while its gear meshes with shutter chain gear 6.
7. Cam pin 19 of sleeve 11 moves within cam slot 18 to change the phase relation between them.
8. Therefore, the phase relation between main shaft 15 fixed to cam ring 17 and sleeve 10 meshed with shutter chain gear 6 undergoes a change, and shutter blade 12 and screen blade 13 are out of the phase one another to effect fade out photography.
9. When shutter blade 12 and screen blade 13 get out of phase completely and the incoming light rays are screened, control gear 37 is checked against turning by toothless portion 40 and at the same time arm 52 of time set up release gear 51 engages with bent-up portion 62 of switch lock lever 34 to turn it counter-clockwise against spring 33 and release the restraining of contact pieces 66, 67 to contacts 70, 71 on the opposite side.
10. By changing over change-over switch 32, motor 1 is turned in the opposite direction to rewind the film, and in this case incoming light rays are screened thoroughly because of the phase relationship of shutter blade 12 and screen blade 13 and accordingly the exposure is not effected. And at the same time fade out gear 25 is reversed to return release gear 51 counter-clockwise, however, control gear 37 is retained because it does not mesh on account of toothless portion 40.

11. When the film is rewound as long as the length of film in which fade out photography is to be taken, arm 52 of time set up release gear 51 engages with arm 56 of change-over lock lever 55 to turn it clockwise against spring 54 and disengage pawl 59 of lock lever 55 from notch 60 of change-over operation member 30.

12. When that engagement is released change-over operation member 30 is moved to the right by tension spring 29 to return automatically to the N position.

13. Just as change-over operation member 30 is returned, switch 39 is opened and motor 1 is stopped.

14. And, at the same time through coil spring 35 gear train lever 26 of the interlocking clutch turns counter-clockwise, fade out gear 26 recedes, and fade in gear 24 meshes with control gear 37.

15. Working protrusion 31 of change-over operation member 31 pushes to move the contact piece of change-over switch 32 as to turn motor 1 again in the normal direction.

16. Thereupon, after turning the camera to another object to take an overlap photograph, just as release button 57 is pushed down contact piece push spring 58 closes power switch 38 to turn motor 1 in the normal direction because slant face 64 of bent piece 61 has already receded from spring 58.

17. Fade in gear 24 turns the control gear meshed therewith counter-clockwise and driving pin 41 turns operation lever 42 counter-clockwise, and thereby the reverse operations of paragraphs (6), (7), and (8) paragraphs are performed.

18. That is, the phase relation between main shaft 16 fixed to cam ring 17 and sleeve 10 meshed with shutter chain gear 6 is gradually restored to the original state, and shutter blade 12 and screen blade 13 change their phase relationship, and thus fade in photography is accomplished.

19. Just as toothless portion 40 of control gear 37 faces fade in gear 24, screen blade 13 is fully opened, and thereafter normal photography is obtained.

Since the present invention can be operated as described above, when taking an overlap photograph, by operating change-over operation member 30 fade out photography and the rewinding of the film are all done automatically, and then by turning the camera to another desirable object and pushing down the release button fade in and the subsequent normal photograph can be obtained. Therefore, it is possible to very easily perform overlap photography, and especially through the release gear for effecting the time control, the fade out film length, the rewind film length, and the fade in film length can be selected automatically and equally so that the overlap photograph can be precisely taken.

I claim:

1. A control device in a motion picture camera for automatic overlap film operation, comprising:
   means for driving said film;
   change-over means normally biased in a first position for normal photography and movable to a second position for overlap photography;
   first lock means for retaining said change-over means in said second position;
   first switch means operated by said change-over means for reversing said means for driving said film from a normal photography driving direction;
   second lock means for retaining said first switch means in a position whereby said film is driven in said normal photography direction;
   shutter means having a changeable aperture rotated by said means for driving said film;
   rotatable control gear means for controlling said aperture for normal and overlap photography;
   rotatable sector gear means interlocking with said first and second lock means;
   clutch means having first and second gears rotatable in opposite directions for engaging said control gear and said sector gear means with said means for driving said film; and
   said control gear means including means for disengaging said first gear for blocking the aperture of said shutter means, and for disengaging said second gear for opening the aperture of said shutter means.

2. A control device as in claim 1 further comprising means for releasing said second lock means; said clutch means further including means for actuating said means for releasing to terminate operation of said means for driving film in a reverse direction.

* * * * *